United States Patent
Vito et al.

(10) Patent No.: US 11,540,565 B2
(45) Date of Patent: Jan. 3, 2023

(54) IMPACT-RESISTANT MATERIAL AND PAD

(71) Applicant: Matscitechno Licensing Company, Kennett Square, PA (US)

(72) Inventors: Robert A. Vito, Kennett Square, PA (US); Michael Foerster, Newtown Square, PA (US)

(73) Assignee: Matscitechno Licensing Company, Kennett Square, PA (US)

( * ) Notice: Subject to any disclaimer, the term of this patent is extended or adjusted under 35 U.S.C. 154(b) by 0 days.

(21) Appl. No.: 15/578,961

(22) PCT Filed: May 31, 2016

(86) PCT No.: PCT/US2016/034975
§ 371 (c)(1),
(2) Date: Dec. 1, 2017

(87) PCT Pub. No.: WO2016/196441
PCT Pub. Date: Dec. 8, 2016

(65) Prior Publication Data
US 2018/0132547 A1    May 17, 2018

Related U.S. Application Data

(60) Provisional application No. 62/169,802, filed on Jun. 2, 2015.

(51) Int. Cl.
*A41D 13/015* (2006.01)
*B32B 5/18* (2006.01)
(Continued)

(52) U.S. Cl.
CPC ....... *A41D 13/015* (2013.01); *A41D 13/0518* (2013.01); *A63B 71/12* (2013.01);
(Continued)

(58) Field of Classification Search
CPC .. A41D 13/015; A41D 13/0518; A63B 71/08; A63B 2071/1208; A63B 71/0054;
(Continued)

(56) References Cited

U.S. PATENT DOCUMENTS 5,938,878 A * 8/1999 Hurley ............... A43B 5/08
156/219
6,093,468 A * 7/2000 Toms ............... A41D 13/0158
428/67
(Continued)

FOREIGN PATENT DOCUMENTS

CA    2300774 A1    9/2001
EP    1886717 A1    2/2008
(Continued)

OTHER PUBLICATIONS

Chinese Office Action for Chinese Application No. 201680039263.0, dated Mar. 12, 2019, with translation, 17 pages.
(Continued)

*Primary Examiner* — Jasper Saberi
(74) *Attorney, Agent, or Firm* — RatnerPrestia

(57) ABSTRACT

Impact-resistant materials and pads are disclosed. An impact-resistant material includes a first elastomer layer having a first density, a second elastomer layer having a second density higher than the first density, a layer of high-tensile strength fibrous material, and a polymer layer. These layers are preferably be arranged in the order in which they are recited. These layers may also be included in an impact-resistant pad configured to be worn by a user. The first elastomer layer is positioned directly adjacent the user when the pad is worn by the user.

26 Claims, 1 Drawing Sheet

(51) Int. Cl.
*B32B 5/32* (2006.01)
*B32B 7/02* (2019.01)
*B32B 27/12* (2006.01)
*B32B 25/04* (2006.01)
*B32B 25/10* (2006.01)
*B32B 27/32* (2006.01)
*B32B 5/24* (2006.01)
*B32B 27/30* (2006.01)
*B32B 27/34* (2006.01)
*A41D 13/05* (2006.01)
*A63B 71/12* (2006.01)
*B32B 5/02* (2006.01)

(52) U.S. Cl.
CPC .................. *B32B 5/02* (2013.01); *B32B 5/18* (2013.01); *B32B 5/24* (2013.01); *B32B 5/245* (2013.01); *B32B 5/32* (2013.01); *B32B 7/02* (2013.01); *B32B 25/042* (2013.01); *B32B 25/045* (2013.01); *B32B 25/10* (2013.01); *B32B 27/12* (2013.01); *B32B 27/302* (2013.01); *B32B 27/304* (2013.01); *B32B 27/32* (2013.01); *B32B 27/34* (2013.01); *A41D 2600/20* (2013.01); *A63B 2071/1208* (2013.01); *B32B 2250/04* (2013.01); *B32B 2255/02* (2013.01); *B32B 2255/26* (2013.01); *B32B 2262/0269* (2013.01); *B32B 2262/101* (2013.01); *B32B 2266/0207* (2013.01); *B32B 2266/08* (2013.01); *B32B 2305/022* (2013.01); *B32B 2307/54* (2013.01); *B32B 2307/558* (2013.01); *B32B 2307/56* (2013.01); *B32B 2307/72* (2013.01); *B32B 2307/732* (2013.01); *B32B 2571/00* (2013.01)

(58) Field of Classification Search
CPC . A63B 2071/0063; B32B 5/245; B32B 27/12; B32B 5/32; B32B 2571/00; B32B 2571/02; B32B 2307/72; B32B 2307/558; B32B 2305/022; B32B 2307/56; B32B 2250/04
See application file for complete search history.

(56) References Cited

U.S. PATENT DOCUMENTS

| | | | |
|---|---|---|---|
| 8,297,601 B2 * | 10/2012 | Vito | B32B 1/08 267/152 |
| 2005/0090339 A1 | 4/2005 | Gans et al. | |
| 2006/0005306 A1 * | 1/2006 | Call | A41D 13/0518 2/463 |
| 2008/0113143 A1 | 5/2008 | Taylor | |
| 2008/0235855 A1 * | 10/2008 | Kobren | A41D 13/0518 2/463 |
| 2009/0191989 A1 * | 7/2009 | Lammer | A42B 3/063 473/535 |
| 2010/0272969 A1 | 10/2010 | Taylor | |
| 2013/0000023 A1 * | 1/2013 | Kraemer | A63B 71/12 2/459 |
| 2014/0206248 A1 | 7/2014 | Vito | |
| 2014/0290158 A1 | 10/2014 | Meersseman et al. | |
| 2014/0318037 A1 | 10/2014 | Aldino et al. | |
| 2017/0340039 A1 * | 11/2017 | Jur | A41D 13/0512 |

FOREIGN PATENT DOCUMENTS

| | | |
|---|---|---|
| GB | 1556357 11 | 11/1979 |
| WO | 9841118 A1 | 9/1998 |

OTHER PUBLICATIONS

Canadian Office Action for Canadian Application No. 2,987,920, dated Feb. 1, 2019, 3 pages.
International Search Report and Written Opinion for International Application No. PCT/US2016/034975, dated Aug. 24, 2016, 11 pages.
Extended European Search Report for European Application No. 16804208.3, dated Nov. 26, 2018, 7 pages.
Chinese Office Action for Chinese Application No. 201680039263. 0, dated Sep. 25, 2019 with partial translation, 13 pages.
Chinese Office Action for Chinese Application No. 201680039263. 0, dated Jun. 15, 2020, with translation, 12 pages.
European Communication pursuant to Article 94(3) for European Application No. 16 804 208.3, dated Mar. 26, 2021, 6 pages.

* cited by examiner

IMPACT-RESISTANT MATERIAL AND PAD

CROSS-REFERENCE TO RELATED APPLICATIONS

This application is a U.S. National Phase Application of PCT International Application PCT/US2016/034975, filed May 31, 2016, and claims the benefit of U.S. provisional application No. 62/169,802, entitled IMPACT-RESISTANT MATERIAL AND PAD filed on Jun. 2, 2015, the contents of which are incorporated herein by reference.

FIELD OF THE INVENTION

The invention relates generally to the field of protective gear and materials, and more particularly, to impact-resistant materials and pads.

BACKGROUND OF THE INVENTION

Conventionally, participants in sports (e.g. football, rugby, baseball, lacrosse, field hockey, etc.) wear protective gear to cushion the force of impacts that are regularly received during those events. In recent years, the dangers of high-force impacts during such contact sports have been a matter of focus. The dangers of these impacts can be diminished or minimized by effectively cushioning participants from the forces of impacts.

For one example, sudden cardiac death by chest impact in sports, known as commotio cordis, is a fear in sports with projectiles. Baseball, lacrosse, and hockey are three common sports in which commotio cordis occurs. More concerningly, commotio cordis has occurred due to chest wall impacts despite the athletic participant wearing of a chest protector. In fact, potentially one third of commotio cordis events in the above competitive sports occur in individuals wearing a chest protector. Accordingly, improved impact-resistant materials and pads are required that adequately protect athletes from the risk of commotio cordis.

SUMMARY OF THE INVENTION

Aspects of the invention are directed to impact-resistant materials and pads.

In accordance with one aspect of the present invention, an impact-resistant material is disclosed. The material includes a first elastomer layer having a first density, a second elastomer layer having a second density higher than the first density, a layer of high-tensile strength fibrous material, and a polymer layer. These layers are preferably be arranged in the order in which they are recited.

In accordance with another aspect of the present invention, an impact-resistant pad is disclosed. The impact-resistant pad is configured to be worn by a user. The pad includes a first elastomer layer having a first density, a second elastomer layer having a second density higher than the first density, a layer of high-tensile strength fibrous material, and a polymer layer. These layers are preferably be arranged in the order in which they are recited, such that the first elastomer layer is positioned directly adjacent the user when the pad is worn by the user.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. According to common practice, the various features of the drawings are not drawn to scale unless otherwise indicated. To the contrary, the dimensions of the various features may be expanded or reduced for clarity. Included in the drawings are the following FIGURES.

DETAILED DESCRIPTION OF THE INVENTION

Figure 1:
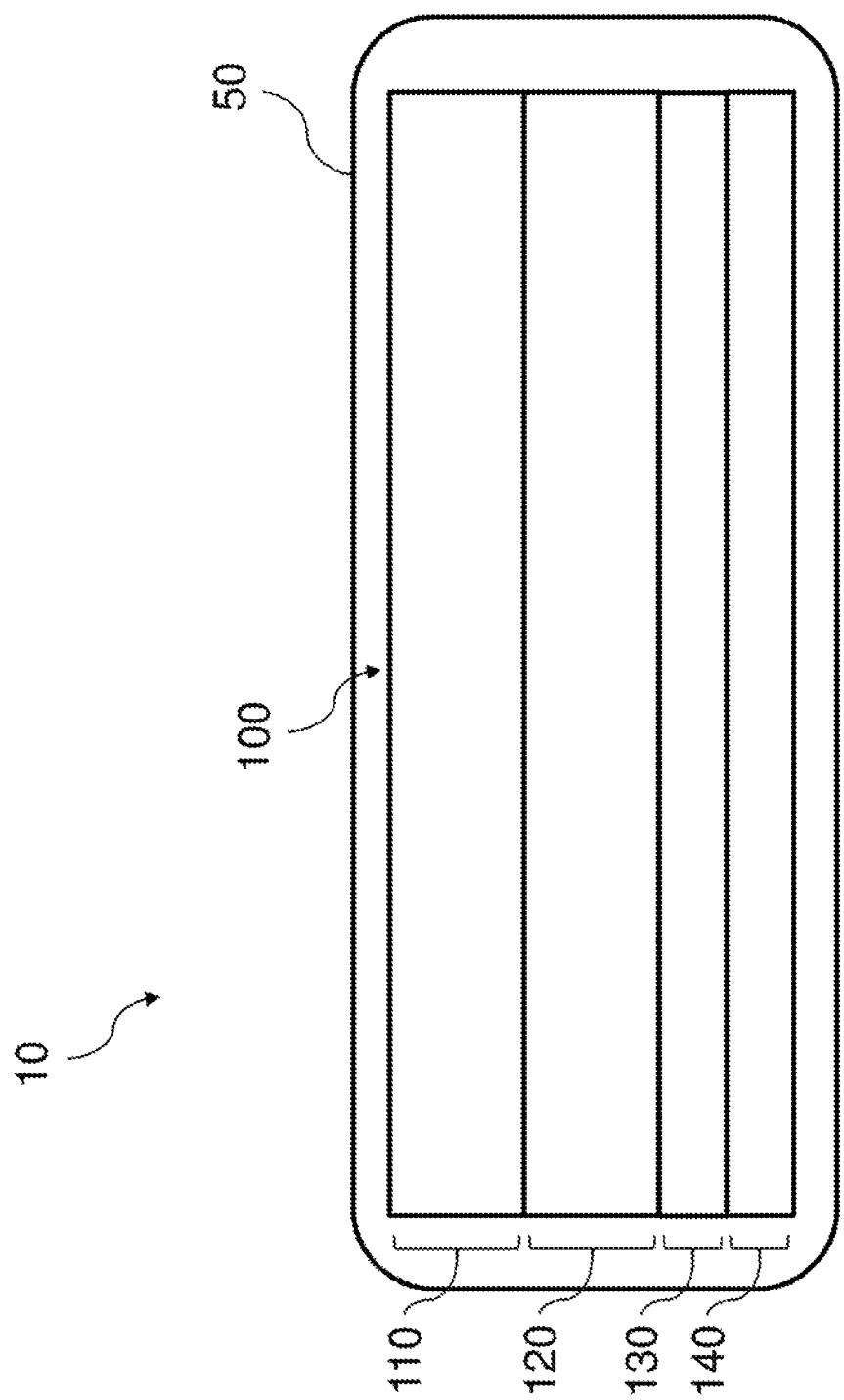
FIG. 1 is a diagram illustrating a cross-sectional view of an exemplary impact-resistant pad in accordance with aspects of the present invention.

The exemplary materials disclosed herein are configured to provide improved protection against the force of impacts. The impact-resistant materials are suited to be employed as a sole source of protection in an impact-resistant pad, or in combination with other protective pads and/or layering. The impact-resistant materials and pads may generally be employed under protective gear, clothing, or devices where impact resistance is desired. As used herein, the term "impact-resistant" is intended to encompass any object that partially or fully lessens, diminishes, dissipates, deflects, or absorbs the force of an impact.

The exemplary materials and pads described herein are particularly suitable for providing protection against high impact forces caused by projectiles in athletic activities. The disclosed materials and pads desirably reduce or eliminate the risk of occurrence of commotio cordis to a user wearing the disclosed embodiments.

While the exemplary embodiments of the invention are described herein with respect to athletic activities, it will be understood that the invention is not so limited. Suitable applications for apparatuses of the present invention include, for example, military gear, police gear, and construction gear. Other suitable applications will be readily understood by one of ordinary skill in the art from the description herein.

Referring now to the drawings, FIG. 1 illustrates an exemplary impact-resistant pad 10 in accordance with aspects of the present invention. Impact-resistant pad 10 provides protection to a user against the force of impacts during, for example, athletic activities. As a general overview, impact-resistant pad 10 includes an impact-resistant material 100 that is formed from a first elastomer layer 110, a second elastomer layer 120, a layer 130 of high-tensile strength fibrous material, and a polymer layer 140. Additional details regarding impact-resistant pad 10 are described herein.

Impact-resistant pad 10 is configured to be worn by a user. For one example, impact-resistant material 100 may be shaped or contoured in order to correspond to a portion of the anatomy of the user. For another example, impact-resistant pad 10 may include one or more additional structures adapted to secure the impact-resistant material 100 to the user. Such structures include, by way of example, straps, belts, or garments which may be attached to the user to secure impact-resistant material 100 to the user. Other suitable structures for adapting impact-resistant material 100 to be worn by the user will be known to one of ordinary skill in the art from the description herein.

In an exemplary embodiment, impact-resistant pad 10 is configured to cover the user's chest with impact-resistant material 100 when worn by the user. Providing a layer of impact-resistant material 100 covering the user's chest desirably reduces or eliminates the risk of occurrence of commotio cordis to a user taking part in an athletic activity.

Impact-resistant material 100 may consist solely of first elastomer layer 110, second elastomer layer 120, high-tensile strength fibrous material layer 130, and polymer layer 140, or may comprise additional layers of impact-resistant material. Other suitable impact-resistant material layers will be known to one of ordinary skill in the art, and include for example, additional elastomer or high-tensile strength fibrous material layers.

The layers of impact-resistant material 100 are desirably arranged in a particular order in order to optimally dissipate the force of impacts to the user of impact-resistant pad 10. In an exemplary embodiment, the first and second elastomer layers 110 and 120 are positioned on one side (e.g., an inner side) of impact-resistant material 100, and high-tensile strength fibrous material layer 130 and polymer layer 140 are positioned on the other side (e.g., an outer side) of impact-resistant material.

In a preferred embodiment, impact-resistant material 100 is arranged in the order shown in FIG. 1. In other words, first elastomer layer 110 is arranged directly adjacent second elastomer layer 120, second elastomer layer 120 is arranged directly adjacent high-tensile strength fibrous material layer 130, and high-tensile strength fibrous material layer is arranged directly adjacent polymer layer 140. In this embodiment, first elastomer layer 110 is the innermost layer of pad 10, such that elastomer layer 110 is arranged directly adjacent the user when impact-resistant pad 10 is worn by the user. More preferably, first elastomer layer 110 has a density sufficiently low to enable it to mold to a shape of the user when impact-resistant pad 10 is worn by the user. Such molding may desirably increase the comfort and stability of pad 10 during use.

First elastomer layer 110 has a first density. The first density is preferably low enough to provide comfort and contouring to a user, while high enough to provide some dissipation of the force of impacts. In an exemplary embodiment, first elastomer layer 110 has a density of at least 6 lbs. per cubic foot. In a preferred embodiment, first elastomer layer 110 has a density of at least 6 lbs. per cubic foot, and no more than 29 lbs. per cubic foot. In a more preferred embodiment, first elastomer layer 110 has a density of around approximately 9 lbs. per cubic foot.

Suitable elastomer materials for use in forming first elastomer layer 110 generally include, but are not limited to, urethane rubbers, silicone rubbers, nitrile rubbers, butyl rubbers, acrylic rubbers, natural rubbers, styrene-butadiene rubbers, and the like. Other suitable elastomers will be known to one of ordinary skill in the art from the description herein. In general, any suitable elastomer material can be used to form first elastomer layer 110 without departing from the scope of the present invention. Elastomer material may provide impact-resistance by absorbing and/or dissipating the forces of impacts along the surface of the elastomeric material.

In an exemplary embodiment, first elastomer layer comprises a layer of dosed cell, low density soft elastomeric foam. In a preferred embodiment, first elastomer layer comprises a layer of AIRILON® padding material, provided by Unequal Technologies Company, of Glen Mills, Pa., USA.

Second elastomer layer 120 has a second density which is higher than the first density of first elastomer layer 110. The second density is preferably high enough to substantially maintain its structure during impacts, and avoid "bottoming out" (i.e., reaching full compression) during impacts regularly received during athletic activities. Second elastomer layer 120 may provide exceptional impact-resistance via a "hysteretic damping" mechanism that dissipates impact force by converting impact energy into heat. In an exemplary embodiment, second elastomer layer 120 has a density of at least 30 lbs. per cubic foot. In a preferred embodiment, second elastomer layer 120 has a density of at least 30 lbs. per cubic foot, and no more than 50 lbs. per cubic foot. In a more preferred embodiment, second elastomer layer 120 has a density of around approximately 32 lbs. per cubic foot.

Suitable elastomer materials for use in forming second elastomer layer 120 generally include any of the types of materials recited above with respect to first elastomer layer 110. In an exemplary embodiment, second elastomer layer comprises a layer of closed cell, high density elastomeric foam. In a preferred embodiment, first second elastomer layer comprises a layer of ACCELLERON® padding material, provided by Unequal Technologies Company, of Glen Mills, Pa., USA.

Layer 130 comprises high-tensile strength fibrous material. The high-tensile strength fibers are configured to dissipate the energy of an impact along the length of the fibers, thus spreading out the force along the entire surface of impact-resistant material 100.

Suitable high-tensile strength fibrous materials include, but are not limited to, aramid fibers, para-aramid or synthetic fibers, fiberglass, or other high-tensile strength fibers. Other suitable high-tensile strength fiber materials will be known to one of ordinary skill in the art from the description herein.

In an exemplary embodiment, layer 130 comprises a layer of elastomeric coated aramid fibers. In a preferred embodiment, layer 130 comprises a layer of TRIDUR® padding material, provided by Unequal Technologies Company, of Glen Mills, Pa., USA. Alternatively, the fibers used could be KEVLAR® material, provided by E.I. du Pont de Nemours and Company, of Wilmington, Del., USA.

The high-tensile strength fibers of layer 130 may be coated with one or more substances. In an exemplary embodiment, the high-tensile strength fibers 130 are coated with a polymer material. The polymer material may be the same as or different from the polymer material of polymer layer 140. In a preferred embodiment, the polymer material coating high-tensile strength fibrous material layer 130 may be part of polymer layer 140. In an alternative embodiment, the polymer material coating high-tensile strength fibrous material layer 130 is separate from polymer layer 140.

Polymer layer 140 comprises a polymer material. Polymer layer 140 may consist of a single layer of polymer material, or may comprise a plurality of layers of polymer material formed one on top of the other. The polymer material of polymer layer 140 blocks and redirects the energy from impacts laterally along the surface of polymer layer 140.

Suitable polymer materials for use in forming polymer layer 140 generally include natural or synthetic polymers, such as polypropylene, polyethylene, polystyrene, polyvinyl chloride, nylon, etc. Other suitable polymers will be known to one of ordinary skill in the art from the description herein. In an exemplary embodiment, polymer layer 140 comprises multiple layers of polypropylene. In a preferred embodiment, polymer layer 140 comprises a layer of IMPACSHIELD® padding material, provided by Unequal Technologies Company, of Glen Mills, Pa., USA.

The ability to dissipate the force of impacts is of paramount importance in impact-resistant pad 10. Nonetheless, it is also desirable that impact-resistant pad 10 be sufficiently thin to enable comfort, flexibility, and ease of movement during athletic activities. To this end, the layers of impact-resistant material 100 may be limited in thickness to a range that provides adequate impact-resistance without being overly thick.

In an exemplary embodiment, first elastomer layer 110 and second elastomer layer 120 each have a total thickness from 6.0 mm to 12.0 mm. In a more preferred embodiment, first elastomer layer 110 and second elastomer layer 120 each have a total thickness from 8.0 mm to 10 mm. In an exemplary embodiment, high-tensile strength fibrous material layer 130 has a total thickness from 1 to 2 mm. In an exemplary embodiment, polymer layer 140 has a total thickness (including all layers thereof) from 0.2 mm to 1.0 mm. In a more preferred embodiment, polymer layer 140 has total thickness from 0.3 mm to 0.7 mm. In view of the embodiments above, it is desirable that impact-resistant material 100 have a total thickness of no more than 25.0 mm. The total system (110, 120, 130 and 140 combined) preferably ranges from a minimum of 12.5 mm to a maximum thickness of 25 mm based on the desired level of protection. The remaining components of impact-resistant pad 10 may or may not substantially increase the thickness of impact-resistant pad 10 beyond the thickness of impact-resistant material 100.

Impact-resistant pad 10 is not limited to the above-described components, but may include alternative or additional components, as would be understood by one of ordinary skill in the art from the description herein.

In one embodiment, pad 10 further includes a fabric material 50 surrounding the impact-resistant material 100. Fabric material 50 collectively surrounds first elastomer layer 110, second elastomer layer 120, high-tensile strength fibrous material layer 130, and polymer layer 140. Fabric material 50 may be provided to increase the comfort and/or aesthetic appearance of pad 10. Additionally, fabric material 50 may be provided in order to facilitate coupling pad 10 to the user. For example, fabric material 50 may accommodate impact-resistant material 100 while providing a connection point for any of the structures set out above for securing pad 10 to the user.

While impact-resistant material 100 is described herein as comprising two elastomer layers, it will be understood from the description herein that the invention is not so limited. To the contrary, impact-resistant material 100 may include three or more elastomer layers of varying densities. Where three or more elastomer layers are included, it may be desirable that the elastomer layers each have a different density, to provide a different profile of impact dissipation. It may further be desirable to arrange the three or more elastomer layers in order of their densities, e.g., from lowest density to highest density (in a direction moving away from the user). This may assist in achieving the goals of impact dissipation and comfort encompassed by aspects of the present invention.

Additionally, while impact-resistant material 100 is described herein as comprising polymer layer 140, it will be understood from the description herein that in some embodiments, polymer layer 140 may be omitted. In particular, where high-tensile strength fibrous material layer 130 comprises a layer of coated fibers, polymer layer 140 may be unnecessary, and may be omitted.

EXAMPLES OF THE INVENTION

Exemplary embodiments of the present invention were tested with respect to their ability to prevent the occurrence of commotio cordis. The protocol for these tests was approved by the Animal Research Committee of the New England Medical Center as being in conformity with the regulations of the Association for Assessment and Accreditation of Laboratory Animal Care, and is outlined below.

The tests described herein were performed using juvenile domesticated male swine, aged 12 to 16 weeks old and weighing 15 to 25 kg (mean±1.5 kg). The swine were sedated with 12 mg/kg intramuscular ketamine and then anesthetized with inhaled 1%-2% isoflurane mixed with oxygen. Anesthesia was maintained with isoflurane. Pressure catheters were placed in the left ventricle. The animals were then placed in a prone position in a sling to approximate physiologic blood flow and cardiac hemodynamics of a human participant in an athletic activity.

Chest wall impacts approximating those occurring during conventional athletic activities were produced using a typical lacrosse ball mounted on a lightweight (20 g) aluminum shaft. The impact object was directed to strike the animal perpendicular to the chest wall, directly over the center of the heart during a time window determined to be during a vulnerability period for producing ventricular fibrillation (VF). Impacts occurring outside of this time window were excluded from the analysis. All impacts occurred at 40 mph.

For each impact-resistant material, the test protocol was the same. The order of impacts with the individual material or a control impact (impact without an impact-resistant material) were randomized. A window of at least two minutes window was provided between impacts. After all impact-resistant materials and a control impact were completed, the materials and control impact were randomized again. Impacts were then repeated. Up to twenty impacts were given for a single animal. All impact-resistant materials were cut to a 4 in. by 4 in. square so as to be placed securely against the animal's torso.

The chart below documents percentage incidence of VF relative to total number of impacts. The numbers in the columns for AIRILON®, ACCELLERON®, and IMPACSHIELD® represent a thickness of the respective layer. The label "N/A" indicates that the respective layer was not used.

TABLE 1

| Material No. | AIRILON ® | ACCELLERON ® | TRIDUR ® | IMPACSHIELD ® | % VF |
| --- | --- | --- | --- | --- | --- |
| Control | N/A | N/A | N/A | N/A | 54 |
| 1 | 6 mm | 10 mm | Yes | .35 mm | 20 |
| 2 | 8 mm | 10 mm | Yes | .35 mm | 8 |
| 3 | 10 mm | 10 mm | Yes | .35 mm | 20 |
| 4 | 10 mm | 10 mm | Yes | .67 mm | 5 |
| 5 | N/A | 6 mm | Yes | .35 mm | 33 |

TABLE 1-continued

| Material No. | AIRILON ® | ACCELLERON ® | TRIDUR ® | IMPACSHIELD ® | % VF |
|---|---|---|---|---|---|
| 6 | N/A | 6 mm | Yes | N/A | 54 |
| 7 | N/A | 8 mm | Yes | .35 mm | 60 |
| 8 | N/A | 10 mm | Yes | N/A | 50 |
| 9 | N/A | N/A | Yes | .12 mm | 60 |
| 10 | N/A | N/A | Yes | N/A | 40 |
| 11 | N/A | N/A | Yes | N/A | 33 |
| 12 | N/A | N/A | Yes | N/A | 42 |

As shown in Table 1, impacts without any impact-resistant material caused VF in 54% of subjects. Impact-resistant materials nos. 1-4, which represent exemplary embodiments of the present invention, significantly decreased the incidence of VF due to impacts. In particular, material no. 2, reduced the incidence of VF down to 8%, material nos. 1 and 3 reduced the incidence of VF down to 20%, and material no. 4 reduced the incidence of VF down to 5%. All four of the above materials include the four layers recited above in the exemplary embodiments of the present invention. The remaining impact-resistant materials, none of which included all four layers of the exemplary embodiments of the present invention, did not significantly lower the incidence of VF.

The above examples demonstrate that the exemplary embodiments of present embodiment provide increased protection against commotio cordis relative to conventional combinations or formulations of impact-resistant materials. For the maximum tested thickness of the four materials, the incidence of VF was reduced from 54% without impact-resistant material to 5%. Other thinner combinations of the same materials statistically reduced VF compared to no impact-resistant material. Given the test protocols, these results are expected to be transferable and reproducible during live athletic activities. Pads utilizing the disclosed impact-resistant materials are expected to be efficacious in reducing the risk of commotio cordis for athletes.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An impact-resistant material consisting of:
a first elastomer layer having a first density;
a second elastomer layer having a second density higher than the first density;
a layer of high-tensile strength fibrous material; and
a polymer layer, wherein
the first elastomer layer is arranged directly adjacent the second elastomer layer;
the second elastomer layer is arranged directly adjacent the layer of high-tensile strength fibrous material; and
the layer of high-tensile strength fibrous material is arranged directly adjacent the polymer layer,
wherein the impact-resistant material has a total thickness of no more than 25.0 mm, and
wherein the polymer layer has a total thickness from 0.3 mm to 0.7 mm.

2. The impact-resistant material of claim 1, wherein the first elastomer layer comprises a layer of closed cell foam.

3. The impact-resistant material of claim 1, wherein the first density is around approximately 9 lbs. per cubic foot.

4. The impact-resistant material of claim 1, wherein the first elastomer layer has a total thickness from 6.0 mm to 12.0 mm.

5. The impact-resistant material of claim 1, wherein the second elastomer layer comprises a layer of closed cell foam.

6. The impact-resistant material of claim 1, wherein the second density is around approximately 32 lbs. per cubic foot.

7. The impact-resistant material of claim 1, wherein the second elastomer layer has a total thickness from 6.0 mm to 12.0 mm.

8. The impact-resistant material of claim 1, wherein the layer of high-tensile strength fibrous material comprises a layer of aramid fibers.

9. The impact-resistant material of claim 1, wherein the polymer layer comprises a polypropylene polymer layer.

10. The impact-resistant material of claim 9, wherein the polypropylene polymer layer comprises multiple polypropylene polymer layers.

11. An impact-resistant pad configured to be worn by a user, the pad comprising an impact-resistant material consisting of:
a first elastomer layer having a first density;
a second elastomer layer having a second density higher than the first density;
a layer of high-tensile strength fibrous material; and
a polymer layer, wherein
the first elastomer layer is arranged directly adjacent the second elastomer layer;
the second elastomer layer is arranged directly adjacent the layer of high-tensile strength fibrous material; and
the layer of high-tensile strength fibrous material is arranged directly adjacent the polymer layer,
wherein the impact-resistant material has a total thickness of no more than 25.0 mm, and
wherein the polymer layer has a total thickness from 0.3 mm to 0.7 mm.

12. The impact-resistant pad of claim 11, wherein the first elastomer layer is arranged to be directly adjacent the user when the impact-resistant pad is worn by the user.

13. The impact-resistant pad of claim 12, wherein the first elastomer layer is configured to mold to a shape of the user when the impact-resistant pad is worn by the user.

14. The impact-resistant pad of claim 11, further comprising a fabric material surrounding the first elastomer layer, the second elastomer layer, the layer of high-tensile strength fibrous material, and the polymer layer.

15. The impact-resistant pad of claim 11, wherein the pad is configured to cover the user's chest when worn by the user.

16. The impact-resistant pad of claim 11, wherein the first elastomer layer comprises a layer of closed cell foam.

17. The impact-resistant pad of claim 11, wherein the first density is around approximately 9 lbs. per cubic foot.

18. The impact-resistant pad of claim 11, wherein the first elastomer layer has a total thickness from 6.0 mm to 12.0 mm.

19. The impact-resistant pad of claim 11, wherein the second elastomer layer comprises a layer of closed cell foam.

20. The impact-resistant pad of claim 11, wherein the second density is around approximately 32 lbs. per cubic foot.

21. The impact-resistant pad of claim 11, wherein the second elastomer layer has a total thickness from 6.0 mm to 12.0 mm.

22. The impact-resistant pad of claim 11, wherein the layer of high-tensile strength fibrous material comprises a layer of aramid fibers.

23. The impact-resistant pad of claim 11, wherein the polymer layer comprises a polypropylene polymer layer.

24. The impact-resistant pad of claim 23, wherein the polypropylene polymer layer comprises multiple polypropylene polymer layers.

25. An impact-resistant material consisting of:
 a first elastomer layer having a first density;
 a second elastomer layer having a second density higher than the first density;
 a layer of high-tensile strength fibrous material, wherein the layer of high-tensile strength fibrous material is coated with a polymer material; and
 a polymer layer separate from the polymer material, wherein
 the first elastomer layer is arranged directly adjacent the second elastomer layer;
 the second elastomer layer is arranged directly adjacent the layer of high-tensile strength fibrous material; and
 the layer of high-tensile strength fibrous material is arranged directly adjacent the polymer layer,
 wherein the impact-resistant material has a total thickness of no more than 25.0 mm, and
 wherein the polymer layer has a total thickness from 0.3 mm to 0.7 mm.

26. An impact-resistant pad configured to be worn by a user, the pad comprising an impact-resistant material consisting of:
 a first elastomer layer having a first density;
 a second elastomer layer having a second density higher than the first density;
 a layer of high-tensile strength fibrous material, wherein the layer of high-tensile strength fibrous material is coated with a polymer material; and
 a polymer layer separate from the polymer material, wherein
 the first elastomer layer is arranged directly adjacent the second elastomer layer;
 the second elastomer layer is arranged directly adjacent the layer of high-tensile strength fibrous material; and
 the layer of high-tensile strength fibrous material is arranged directly adjacent the polymer layer,
 wherein the impact-resistant material has a total thickness of no more than 25.0 mm, and
 wherein the polymer layer has a total thickness from 0.3 mm to 0.7 mm.

\* \* \* \* \*